United States Patent Office  2,985,670
Patented May 23, 1961

2,985,670

SUBSTITUTED BENZENESULFONYL-HYDRAZONES (G)

Hans Willi Zimmer, Cincinnati, Ohio, assignor to The Chattanooga Medicine Company, Chattanooga, Tenn., a corporation of Tennessee No Drawing. Filed July 1, 1958, Ser. No. 745,827

3 Claims. (Cl. 260—397.7)

The instant invention relates to novel organic compounds, and more particularly, to novel substituted benzenesulfonylhydrazones.

Although the compounds of the invention may have a number of uses in various fields, they may be found to be particularly useful as sun screen agents, foaming agents and chemotherapeutic agents. A desirable ingredient for "sun tan" lotions is a sun screen agent with high absorption of ultraviolet radiation in the neighborhood of 2970 A. (which wavelength produces undesirable reddening effect on the skin) and low absorption of light radiation in the neighborhood of 3400 A. (which wavelength produces the maximum tanning effect). The instant compounds possess such absorption spectral characteristics.

Also, the instant compounds may undergo decomposition upon melting and such decomposition is accompanied by the evolution of a large volume of gas, so that these compounds may be added to molten plastic or synthetic resin materials to act as foaming agents therefor.

In addition, the compounds of the invention may display anti-bacterial activity comparable to that of the well known sulfa drugs, sulfanilamide and sulfadiazine. In this respect, it should be noted that certain bacteria such as *Streptococcus pyogenes, Micrococcus pyogenes,* and *Escherichia coli* tend to become resistant to the known sulfa drugs, although they may be particularly sensitive to a new sulfa compound. It is believed that exposure of such bacteria to known sulfa drugs often tends to result in the survival of a strain resistant to such sulfa drugs, but still sensitive to a new sulfa drug to which the strain has not yet been exposed. There is thus a great need for new compounds which display anti-bacterial activity.

It is, therefore, an important object of the instant invention to provide new and useful substituted benzenesulfonylhydrazones.

It is another object of the instant invention to provide new and useful nitro- or acetamido-substituted benzenesulfonylhydrazones of certain cycloaliphatic aldehydes or ketones.

Yet another object of the instant invention is to provide new compounds useful as sun screen agents, foaming agents and/or chemotherapeutic agents.

Other and further objects, features and advantages of the present invention will become apparent to those skilled in the art from the following detailed disclosure thereof.

The instant invention consists in a compound having the formula:

$$A-\langle\phantom{x}\rangle-SO_2NHN=R$$

wherein A is a monovalent radical selected from the group consisting of —NO$_2$ and —NHCOCH$_3$ and R is a divalent radical containing at least one $C_5$—$C_6$ cycloaliphatic ring and not more than two cycloaliphatic rings having not more than three $C_1$—$C_6$ aliphatic groups attached to a cycloaliphatic ring.

Expressed in other terms, the compounds of the invention may be described as nitro- or acetamido-substituted benzenesulfonylhydrazones of aldehydes or ketones containing at least one $C_5$—$C_6$ cycloaliphatic ring and not more than two cycloaliphatic rings, with or without aliphatic substituents. Any such aliphatic substituent being a monovalent aliphatic group having one to six carbon atoms, which may be a saturated or unsaturated straight chain or branched chain hydrocarbon group, such as methyl, ethyl, vinyl, propyl, isopropyl, allyl, n-butyl, isobutyl, sec.-butyl, tert.-butyl, crotyl, amyl, isoamyl, etc., n-hexyl, isohexyl . . ., hexenyl, etc. Preferably, any such aliphatic group is a $C_1$—$C_4$ alkyl group.

Although it is preferred to have the keto O attached to a nuclear C in the cycloaliphatic ring, as in cyclopentanone or methyl cyclopentanone; one of the $C_1$—$C_6$ aliphatic groups may contain the carbonyl radical, as in cyclopentyl acetaldehyde, cyclopentyl acetone, cyclopentyl isobutylketone, cyclohexyl acetaldehyde, cyclohexyl acetone, cyclohexyl amyl ketone, etc. Preferably, the total number of C's in the aldehyde or ketone component is five to ten.

The cycloaliphatic ring structure may be based on cyclopentane (i.e. cyclopentene and cyclopentadiene), cyclohexane (i.e. cyclohexene and cyclohexadiene), or methylene bi-cycloheptane (as in the case of certain terpenals and terpenones).

Typical compounds of the invention include:

p-acetamidobenzenesulfonylhydrazone of cyclopentanone:

$$CH_3CONH-\langle\phantom{x}\rangle-SO_2NHN=C-CH_2-CH_2-CH_2-CH_2$$

p-acetamidobenzenesulfonylhydrazone of 2-ethyl cyclopentanone:

$$CH_3CONH-\langle\phantom{x}\rangle-SO_2NHN=C-CH-C_2H_5-CH_2-CH_2-CH_2$$

p-nitrobenzenesulfonylhydrazone of 2,3-dimethyl cyclopentanone:

$$NO_2-\langle\phantom{x}\rangle-SO_2NHN=C-CH-CH_3-CH_2-CH-CH_3-CH_2$$

p-nitrobenzenesulfonylhydrazone of cyclopentenone:

$$NO_2-\langle\phantom{x}\rangle-SO_2NHN=C-CH-CH_2-CH-CH_2$$

p-nitrobenzenesulfonylhydrazone of cyclopentane formaldehyde:

$$NO_2-\langle\phantom{x}\rangle-SO_2NHN=CH-CH_2-CH_2-CH_2-CH_2$$

p-acetamidobenzenesulfonylhydrazone of cyclopentyl 2-butyl ketone:

$$CH_3CONH-\langle\phantom{x}\rangle-SO_2NHN=C-CH-CH_2-CH_2-CH_2-CH_2$$
with CH$_3$ and CHCH$_2$CH$_3$ branches p-nitrobenzenesulfonylhydrazone of 3-cyclopentyl butyraldehyde:

$$NO_2-C_6H_4-SO_2NHN=CHCH_2-CH(CH_3)-CH-CH_2-CH_2-CH_2-CH_2$$

p-nitrobenzenesulfonylhydrazone of cyclohexanone:

$$NO_2-C_6H_4-SO_2NHN=C(CH_2CH_2)_2CH_2$$

p-acetamidobenzenesulfonylhydrazone of 4-methyl cyclohexanone:

$$CH_3CONH-C_6H_4-SO_2NHN=C(CH_2CH_2)_2CHCH_3$$

p-acetamidobenzenesulfonylhydrazone of 2-methyl cyclohexanone:

$$CH_3CONH-C_6H_4-SO_2NHN=C(CH(CH_3))(CH_2)(CH_2CH_2CH_2)$$

p-acetamidobenzenesulfonylhydrazone of cyclohexyl acetaldehyde:

$$CH_3CONH-C_6H_4-SO_2NHN=CHCH_2-CH(CH_2CH_2)_2CH_2$$

p-nitrobenzenesulfonylhydrazone of fenchone:

$$NO_2-C_6H_4-SO_2NHN=C\text{ (fenchone moiety)}$$

p-nitrobenzenesulfonylhydrazone of camphor:

$$NO_2-C_6H_4-SO_2NHN=C\text{ (camphor moiety)}$$

p-acetamidobenzenesulfonylhydrazone of isophorone:

$$CH_3CONH-C_6H_4-SO_2NHN=C(CH_2)(CH=C(CH_3))-CH_2-C(CH_3)_2$$

p-nitrobenzenesulfonylhydrazone of isophorone:

$$NO_2-C_6H_4-SO_2NHN=C(CH_2)(CH=C(CH_3))-CH_2-C(CH_3)_2$$

The compounds of the instant invention are prepared by reacting the aldehyde or ketone with p-acetamidobenzenesulfonylhydrazine or p-nitrobenzenesulfonylhydrazine. The reaction is carried out advantageously in a solvent. The solvents preferred for use in the preparation of these compounds include water, alcohol, dioxane or mixtures thereof. Both the p-acetamidobenzenesulfonylhydrazine and the p-nitrobenzenesulfonylhydrazine are relatively insoluble in the solvents; and the reaction is facilitated by the application of external heat and agitation. The hydrazine reactant is first placed in the solvent and heat is applied; then substantially an equal molar quantity of the aldehyde or ketone is added, a small amount at a time with stirring, until the reaction is completed, as evidenced by a homogeneous appearance of the reaction mixture. The entire reaction period is but a few minutes (for example, 5 to 10 minutes). The product separates from the reaction mixture on cooling to room temperature and the product may be recrystallized from alcohol, water, dioxane or a mixture thereof, to yield a relatively pure product.

*Example 1* p-Acetamidobenzenesulfonylhydrazine (0.04 mol) is dissolved in 500 ml. of hot water (at 70° C.). Cyclohexanone (0.04 mol) is added to the hot water solution, with vigorous stirring, and such stirring is continued as the solution cools to room temperature. During this cooling period, crystals begin separating from the reaction mixture. After two hours, the crystals are collected on a suction filter and dried in an oven at 95° C. The product is re-crystallized from a mixture of three parts of methanol and two parts of water, to yield a substantially pure product in the form of white crystals which melt with decomposition at 171–171.5° C. Analysis for p-acetamidobenzenesulfonylhydrazone of cyclohexanone: calculated for $C_{14}H_{19}N_3O_3S$ is C=54.35, H=6.19; and found: C=54.30, H=6.37.

*Example 2*

A procedure is carried out that is the same as that of Example 1, except that 4-methyl cyclohexanone is used in place of the cyclohexanone and the result is a white crystalline product melting with decomposition at 162–163° C. Analysis for p-acetamidobenzenesulfonylhydrazone of 4-methyl cyclohexanone: calculated for $$C_{15}H_{21}N_3O_3S$$

is C=55.71, H=6.55, N=12.99; and found: C=55.56, H=6.59, N=12.74.

*Example 3*

A procedure is carried out that is the same as that of Example 1, except that 2-methyl cyclohexanone is used instead of the cyclohexanone and the result is a crystalline product having a light yellow color and melting with decomposition at 150–151° C. Analysis for p-acetamidobenzenesulfonylhydrazone of 2-methyl cyclohexanone: calculated for $C_{15}H_{22}N_3O_3S$ is C=55.71, H=6.55, N=12.99; and found: C=55.63, H=6.51, N=12.78.

*Example 4*

A procedure is carried out that is the same as that of Example 1, except that isophorone is used in place of the cyclohexanone and the result is a white crystalline product melting with decomposition at 176–176.5° C. Analysis for p-acetamidobenzenesulfonylhydrazone of isophorone: calculated for $C_{17}H_{23}N_3O_3S$ is C=58.43, H=6.63; and found: C=58.28, H=6.83.

The procedures just described may be used with other aldehydes or ketones such as cyclopentanone, 2-ethyl cyclopentanone, 2,3-dimethyl cyclopentanone, cyclopentane formaldehyde, cyclopentyl isobutyl ketone, 3-cyclohexyl butyraldehyde, fenchone, camphor, etc., to produce the corresponding hydrazone.

*Example 5* p-Nitrobenzenesulfonylhydrazine (0.025 mol) is slurried, with stirring, in 50 ml. of warm methanol. Cyclohexanone (0.025 mol) is then added dropwise with stirring. After the mixture becomes homogeneous, 20 ml. of water is added. The reaction mixture is allowed to stand overnight and then the crystals which have separated are collected in a suction filter and dried in an oven at 95° C.

The result is a white crystalline product melting with decomposition at 186–186.5° C. Analysis for p-nitrobenzenesulfonylhydrazone of cyclohexanone: calculated for $C_{12}H_{15}N_3O_4S$ is C=48.47, H=5.09; and found: C=48.60, H=5.00.

Example 6

A procedure is carried out that is the same as that of Example 5, except that isophorone is used in place of the cyclohexanone and the result is a greenish-yellow crystalline product melting with decomposition at 134–136° C. Analysis for p-nitrobenzenesulfonylhydrazone of isophorone: calculated for $C_{15}H_{19}N_3O_4S$ is C=53.40, H=5.68; and found: C=53.18, H=6.83. This compound exhibits antibacterial activity with respect to *Streptococcus pyogenes*.

Example 7

A procedure is carried out that is the same as that of Example 5, except that 2-methylcyclohexanone is used in place of the cyclohexanone and the result is a light yellow crystalline product melting with decomposition at 124–125° C. Analysis for p-nitrobenzenesulfonylhydrazone of 2-methylcyclohexanone: calculated for $$C_{13}H_{17}N_3O_4S$$

is C=50.14, H=5.50, N=13.50; and found: C=50.34, H=5.44, N=13.26.

Example 8

A procedure is carried out that is the same as that of Example 5, except that 4-methylcyclohexanone is used in place of the cyclohexanone and the result is a light yellow crystalline product melting with decomposition at 153.5–154.5° C. Analysis for p-nitrobenzenesulfonylhydrazone of 4-methylcyclohexanone: calculated for $C_{13}H_{17}N_3O_4S$ is C=50.14, H=5.50, N=13.50; and found: C=50.14, H=5.54, N=13.42. This compound was found to exhibit antibacterial activity with respect to *Micrococcus pyogenes* and *Escherichia coli*.

The procedure of the foregoing paragraph may be employed replacing the cyclohexanone with cyclopentanone, 2-ethyl cyclopentanone, cyclopentyl isobutyl ketone, 3-cyclohexyl-butyraldehyde, 2-methyl cyclohexanone, fenchone, camphor or isophorone to produce the corresponding p-nitrobenzenesulfonylhydrazones.

The compounds of the invention just decribed show peak absorptions of light radiation in the neighborhood of 2970 A. and low absorption of light radiation in the neighborhood of 3400 A., so that they may be used in sun tan lotions. Also, these compounds undergo decomposition upon melting, so that they may be used as foaming agents in synthetic resins.

It will be understood that modifications and variations may be effected without departing from the spirit and scope of the novel concepts of the present invention.

I claim as my invention:
1. p-Acetamidobenzenesulfonylhydrazone of isophorone.
2. p-Nitrobenzenesulfonylhydrazone of cyclohexanone.
3. p-Nitrobenzenesulfonylhydrazone of 4-methylcyclohexanone.

References Cited in the file of this patent

UNITED STATES PATENTS

| | | |
|---|---|---|
| 2,912,445 | Zimmer | Nov. 10, 1959 |
| 2,950,293 | Zimmer | Aug. 23, 1960 |
| 2,950,294 | Zimmer | Aug. 23, 1960 |
| 2,950,295 | Zimmer | Aug. 23, 1960 |
| 2,950,296 | Zimmer | Aug. 23, 1960 |

FOREIGN PATENTS

| | | |
|---|---|---|
| 901,650 | Germany | Jan. 14, 1954 |

OTHER REFERENCES

Chemical Abstracts, vol. 41, pages 5474–5477 (1947).
Lehmann et al.: Bull. Soc. Chim. Belges, vol. 55, pages 66–67, 83 to 85, 91 to 95 (1946).
Cheronis et al.: Semimicro Qualitative Organic Analysis, pages 179 to 180, Thomas Y. Crowell Co., N.Y. (1947).